(12) United States Patent
Scott

(10) Patent No.: US 7,383,133 B1
(45) Date of Patent: Jun. 3, 2008

(54) DIFFUSE SEISMIC IMAGING SYSTEMS AND METHODS

(75) Inventor: Gary Lee Scott, Richmond, TX (US)

(73) Assignee: PGS Onshore, Inc., Houston, TX (US)

( * ) Notice: Subject to any disclaimer, the term of this patent is extended or adjusted under 35 U.S.C. 154(b) by 0 days.

(21) Appl. No.: 11/784,823

(22) Filed: Apr. 11, 2007

(51) Int. Cl.
*G01V 1/28* (2006.01)

(52) U.S. Cl. .............. 702/16; 702/2; 702/11; 702/13; 702/14; 702/15; 324/533; 324/534; 361/15; 361/21; 361/22; 361/23; 361/24

(58) Field of Classification Search .......... 702/6–7, 702/9–16, 18, 2; 324/533, 534; 367/15, 367/21–24
See application file for complete search history.

(56) References Cited

U.S. PATENT DOCUMENTS

| | | | |
|---|---|---|---|
| 5,377,104 A | | 12/1994 | Sorrells et al. |
| 6,292,754 B1 * | | 9/2001 | Thomsen ............... 702/14 |
| 6,446,007 B1 * | | 9/2002 | Finn et al. ............. 702/14 |
| 6,920,083 B2 | | 7/2005 | Therond et al. |
| 2004/0044479 A1 * | | 3/2004 | Sansone ............... 702/16 |

OTHER PUBLICATIONS

B.S. Artman, "Passive Seismic Imaging", Poster S11E-0334, AGU Fall Meeting, Dec. 2003.

* cited by examiner

*Primary Examiner*—John E. Barlow, Jr.
*Assistant Examiner*—Sujoy K Kundu
(74) *Attorney, Agent, or Firm*—E. Eugene Thigpen; Richard A. Fagin

(57) ABSTRACT

Systems and methods are disclosed to construct subsurface images from diffuse seismic energy. Various disclosed system embodiments include multiple seismic sensors that each convert received seismic energy into one or more seismic signals. One or more processor combine the seismic signals to determine a subsurface map. As part of determining the map, the processor(s) systematically focus the array of seismic sensors on each bin in the subsurface volume of interest. In this manner each bin becomes a focal point of the array. For each bin, the processor(s) analyze the seismic wave travel time to each seismic sensor and apply a corresponding time shift to align the seismic signals with a uniform travel time. The time-shifted seismic signals are then combined to determine an intensity value for seismic energy radiating from the focal point. A subsurface map can then be derived from the intensity value as a function of position.

20 Claims, 4 Drawing Sheets

DIFFUSE SEISMIC IMAGING SYSTEMS AND METHODS

BACKGROUND

Scientists and engineers often employ seismic surveys for exploration, archeological studies, and engineering projects. Seismic surveys can provide information about underground structures, including formation boundaries, rock types, and the presence or absence of fluid reservoirs. Such information greatly aids searches for water, geothermal reservoirs, and mineral deposits such as hydrocarbons and ores. Oil companies in particular often invest in extensive seismic surveys to select sites for exploratory oil wells.

Conventional seismic surveys employ artificial seismic energy sources such as shot charges, air guns, or vibratory sources to generate seismic waves. The sources, when fired, create a seismic "event", i.e., a pulse of seismic energy that propagates as seismic waves from the source down into the earth. Faults and boundaries between different formations create differences in acoustic impedance that cause partial reflections of the seismic waves. A seismic sensor array detects and records these reflections for later analysis. Sophisticated processing techniques are applied to the recorded signals to extract an image of the subsurface structure.

Various techniques have been proposed to eliminate the conventional seismic energy sources from this process. These techniques are often termed "passive seismic" or "micro-seismic" imaging. See, e.g., U.S. Pat. Nos. 5,377,104 and 6,920,083; and B. S. Artman, "Passive Seismic Imaging", Poster S11E-0334, AGU Fall Meeting, December 2003. The proposed techniques generally rely on environmental seismic events such as earthquakes, hydraulic fracturing, drilling operations, or operations of heavy construction equipment. Typically, the proposed techniques employ cross correlation to extract seismic event information, and thereafter the processing can proceed in much the same fashion as conventional seismic survey processing.

Thus existing seismic imaging techniques rely on event-based analysis of wave propagation patterns. Where passive seismic imaging techniques are rendered unsuitable due to the absence of identifiable seismic events, surveyors are required to employ artificial seismic energy sources. Use of such sources can add significant expense to exploratory seismic surveys.

SUMMARY

Accordingly, there is disclosed herein various systems and methods that construct subsurface images from diffuse seismic energy. Various disclosed system embodiments include multiple seismic sensors that each convert received seismic energy into one or more seismic signals. One or more processor combine the seismic signals to determine a subsurface map. As part of determining the map, the processor(s) systematically focus the array of seismic sensors on each bin in the subsurface volume of interest. In this manner each bin becomes a focal point of the array. For each bin, the processor(s) analyze the seismic wave travel time to each seismic sensor and apply a corresponding time shift to align the seismic signals with a uniform travel time. The time-shifted seismic signals are then combined to determine an intensity value for seismic energy radiating from the focal point. A subsurface map can then be derived from the intensity value as a function of position.

Various disclosed method embodiments include: receiving signals from multiple seismic sensors; determining an intensity value for each of a set of focal points; and storing said intensity values. For each focal point, the intensity value determination includes: selecting a time offset for each seismic sensor signal; combining the time-offset seismic sensor signals to obtain a focused-array signal; and calculating an intensity value for said focal point. The time offsets are designed to provide a uniform travel time from the focal point.

As will become apparent, other system and method embodiments are also disclosed herein.

BRIEF DESCRIPTION OF THE DRAWINGS

A better understanding of the various disclosed embodiments can be obtained when the following detailed description is considered in conjunction with the following drawings, in which.

Figure 1:
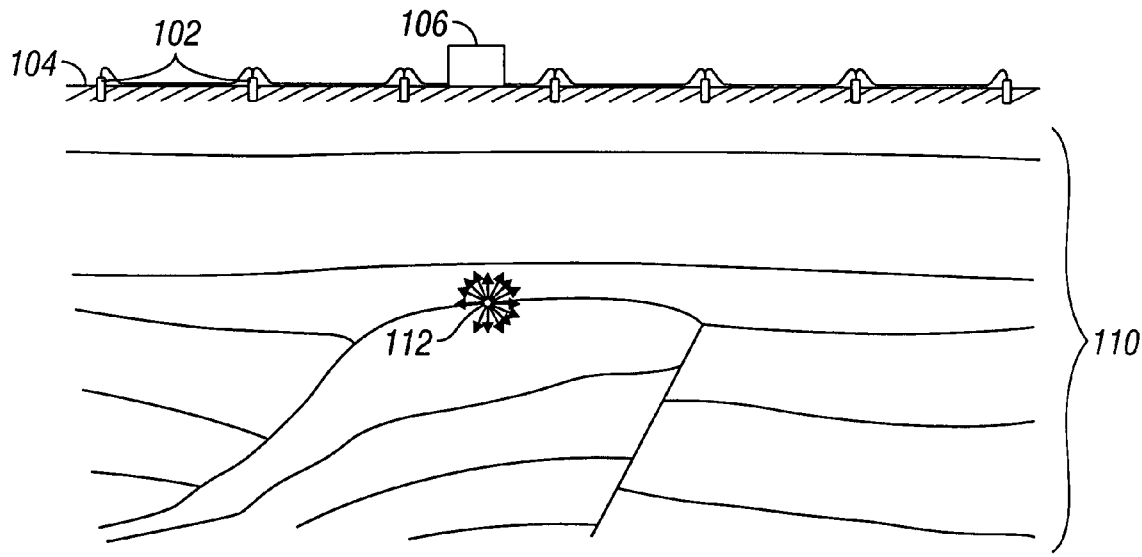
FIG. 1 shows an illustrative survey environment.

While the disclosed systems and methods are susceptible to various modifications and alternative forms, specific embodiments thereof are shown by way of example in the drawings and will herein be described in detail. It should be understood, however, that the drawings and detailed description related thereto are not intended to limit the disclosure to the particular embodiments shown and described, but on the contrary, the intention is to cover all modifications, equivalents and alternatives falling within the spirit and scope of the present invention as defined by the appended claims.

DETAILED DESCRIPTION

Existing seismic survey techniques appear to treat the Earth's subsurface as a relatively quiet environment with separate and identifiable shock waves emanating from discrete seismic events. The present disclosure takes a new approach, treating the Earth's subsurface as a continuously noisy environment permeated with diffuse seismic energy. A comparison of the two circumstances may be analogized to a comparison of a dark room with irregular flashes of a strobe light, and a room lit with diffuse ambient light. As will become clear from the ensuing discussion, it may be considerably easier to form a meaningful image with the new treatment.

FIG. 1 shows an illustrative environment for logging with diffuse seismic energy. A set of seismic energy receivers 102 is positioned in a spaced-apart arrangement on the earth's surface 104. The receivers 102 are coupled to a central processing and/or recording unit 106 that receives the seismic signal data collected by the receivers. Diffuse seismic energy permeates the earth 110, reflecting from acoustic impedance discontinuities. Such discontinuities may be created by faults, boundaries between formation beds, and boundaries between formation fluids.

Seismic energy reflections from discontinuities may be treated as acoustic energy emanations from a set of point sources 112 that together make up the discontinuity. When viewed in this manner, the acoustic impedance discontinuities will appear as bright spots, i.e., as radiators of seismic energy. The intensity of the radiated energy is a function of the reflection coefficient for the discontinuity.

Figure 2:
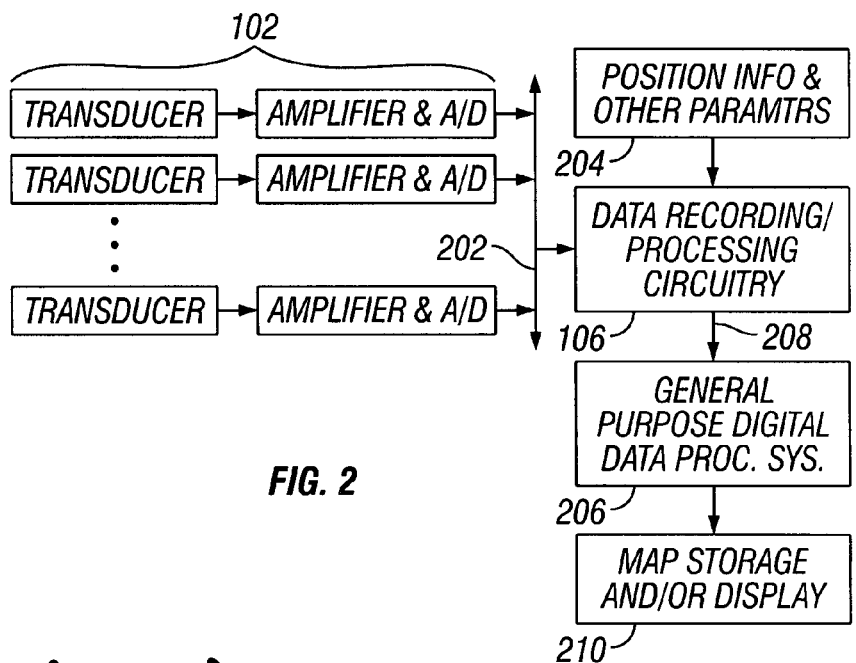
FIG. 2 is a block diagram of an illustrative survey system.

FIG. 2 shows an illustrative block diagram of seismic survey system electronics. The receivers 102 include transducers to convert the seismic wave energy into electric signals, and may further include electronics to filter, amplify, and convert the electric signals into digital data. The digital data may be communicated to the central unit 106 via a bus 202, or alternatively may be communicated via a dedicated information pathway or via a wireless connection. The central unit 106 also collects position information for each of the receivers and any other parameters that may be useful in interpreting the seismic signal data (e.g., number of receivers, type of receivers, calibration information, and so on). The location information and other parameters may be provided via an independent interface 204 such as a user interface that allows manual entry of such information, or a global positioning system (GPS) interface that collects such information from one or more GPS receivers.

In some embodiments, the central unit 106 processes the seismic signal information as it is collected, systematically scanning the subsurface volume of interest and compiling a map in real time. Such embodiments may avoid any need for storing large volumes of seismic data for later analysis. Nevertheless, the central unit 106 may also or alternatively store the collected data on an information storage medium.

Central unit 106 may use any suitable information storage medium. Due to the large volume of information needed to represent seismic survey data, the information storage medium is generally some form of magnetic medium, e.g., disk drives or magnetic tape. However it is expected that the necessary storage capacity may also be provided by optical media or integrated circuit memories, though the associated cost may be somewhat higher. In an alternative embodiment, recording unit 106 simply gathers the data from the receivers and transmits the data in real time to a remote location such as a central storage facility.

In some embodiments, central unit 106 does not itself compile the map, but rather communicates information to a general purpose digital data processing system 206. The communication 208 may take place in any of various ways, including transmission via a wired or wireless communications link, and by physical transport of an information storage medium. System 206 may process the traces to focus the sensor array and determine one or more intensity values for each focal point. (As discussed further below, determination of a given focal point's intensity value as a function of offset may enable velocity field estimation.)

A map of the intensity value as a function of focal point will provide an image of the subsurface structure. Numerous image and seismic processing techniques may be applied to refine the map before it is stored or displayed. A map storage or display unit 210 may take the form of an integrated memory or other information storage medium, a computer printout, and/or a computer monitor that displays the map to a user. Three-dimensional image viewing techniques may alternatively be employed.

Figure 3:
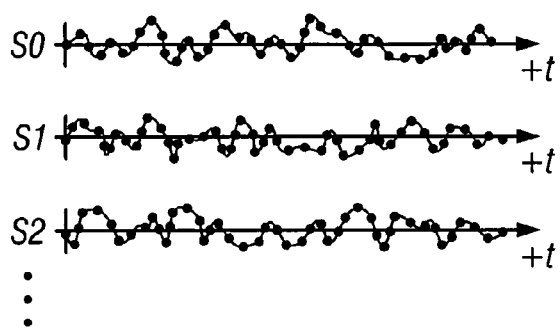
FIG. 3 shows illustrative seismic survey traces.

FIG. 3 shows illustrative seismic signals detected and sampled by receivers 104. The signals indicate some measure of seismic wave energy as a function of time (e.g., displacement, velocity, acceleration, pressure), and they are digitized at high resolution (e.g., 24 bits) at a programmable sampling rate. As discussed further below, seismic sensors can be grouped in different ways to form variable-focus lens-arrays that scan the subsurface volume of interest.

Figure 4:
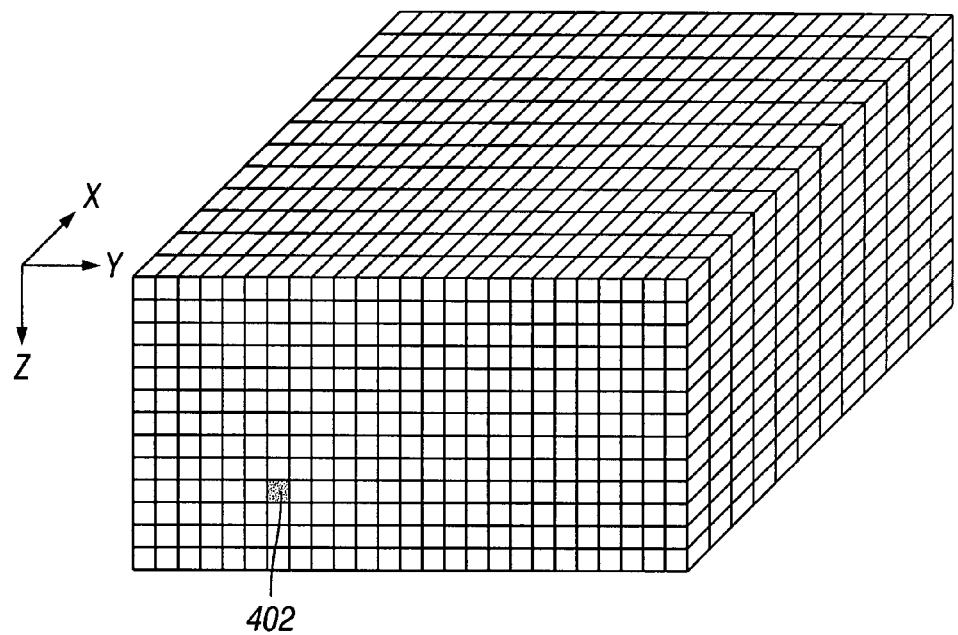
FIG. 4 shows an illustrative data volume with a selected cell.

FIG. 4 shows a "data cube", i.e., a three dimensional array of data values. (Despite the use of the term "cube", the dimensions of the data cube do not have to be equal.) The data cube represents some seismic attribute throughout the subsurface volume of interest. The three-dimensional array preferably consists of uniformly-sized cells, each cell having a data value representing the seismic attribute for that cell. Though seismic energy reflection intensity will be the primary attribute described here, other seismic attributes are also interesting and can be derived from the measured seismic signals. Thus various seismic attributes may be represented, and in some embodiments, each cell has multiple data values to represent multiple seismic attributes. Examples of other seismic attributes include reflectivity, acoustic impedance, acoustic velocity, and density. The data cube format more readily lends itself to computational analysis and visual rendering, and for this reason, the data cube may be termed a "three-dimensional image" of the survey region.

Figure 5:
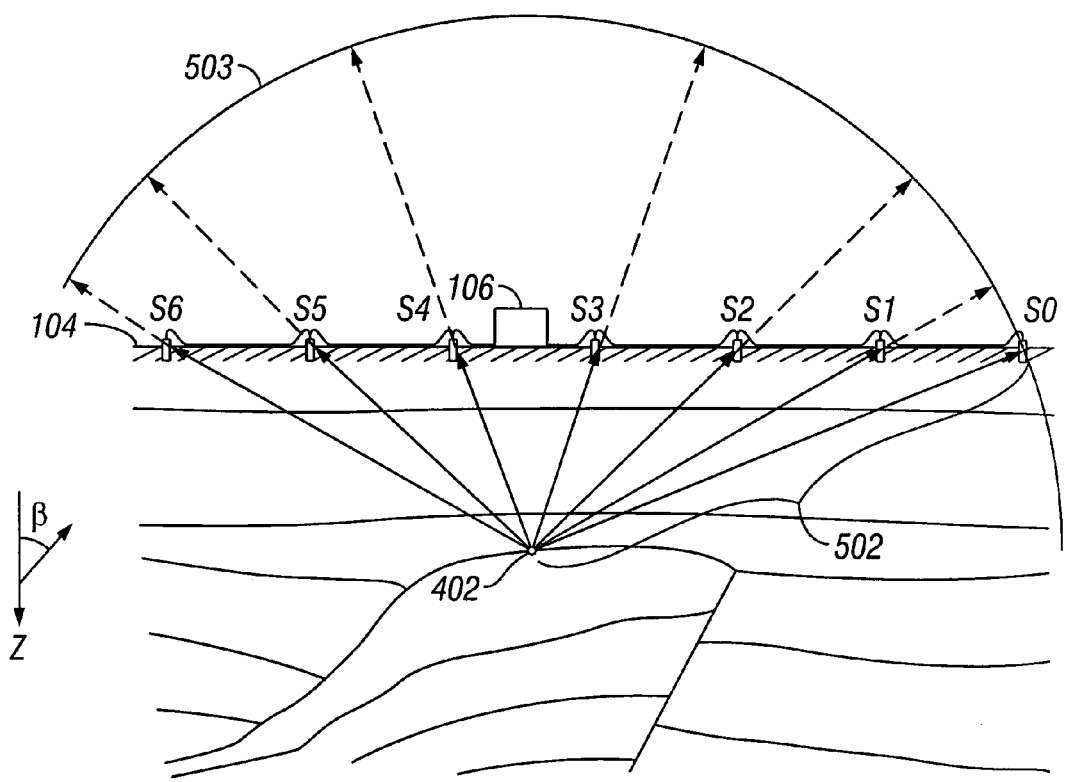
FIG. 5 illustrates a diffuse seismic imaging technique.

FIG. 4 shows a selected cell 402. Various disclosed imaging embodiments employ a scanning technique, in which each cell in the data cube is systematically selected in turn. As shown in FIG. 5, the selected cell 402 becomes a focus point for the array of seismic sensors 102. For a selected cell 402, central unit 106 focuses the array by combining time-shifted signals from the seismic receivers 102. In some embodiments, central unit 106 determines a maximum travel time 502 from the selected cell 402 to a receiver in the array, and uses the travel time 502 as a uniform travel time that defines a wave front 503. Central unit 106 determines for each receiver a time shift that, when summed with the travel time from the selected cell, adds up to the uniform travel time. Note that the uniform travel time can be chosen arbitrarily and may even be set to zero, so that the time shifts are simply the negative of the calculated travel times.

Figure 6A:
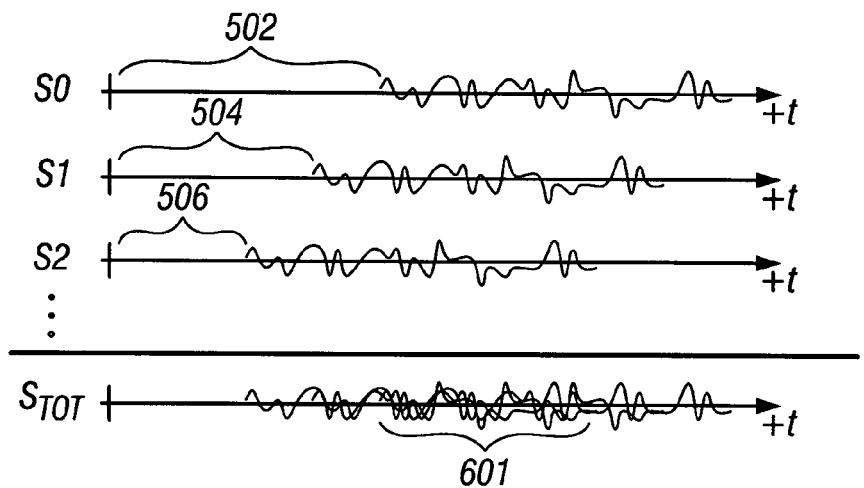
FIGS. 6a-6c show an illustrative time shifting technique applied to seismic survey traces.
Figure 6B:
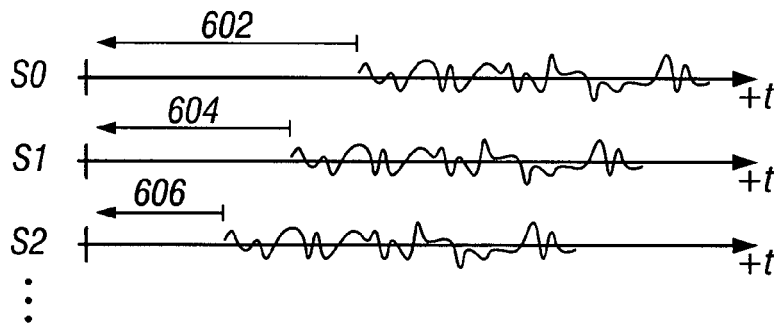
Figure 6C:
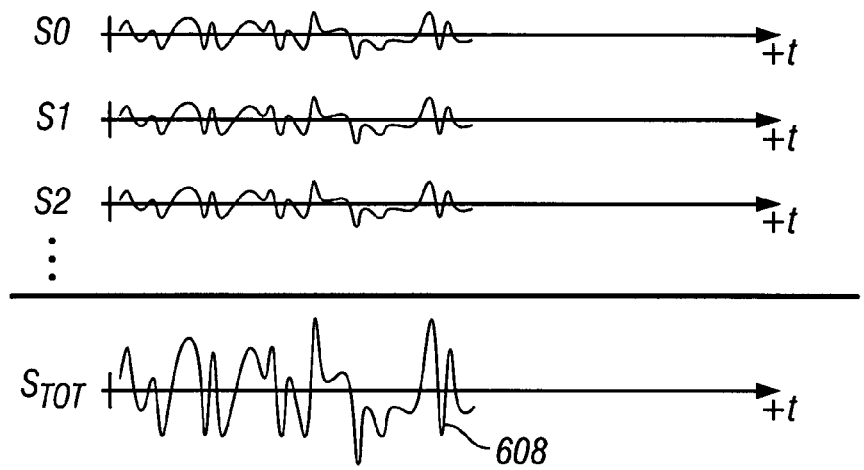

To demonstrate the motivation behind the time shifting performed by central unit 106, FIG. 6a shows the signals that the seismic receivers S0-S2 would receive from focal point 402. For the sake of illustration, FIGS. 6a-6c omit the noise and interference that would be expected from other seismic energy reflectors. FIG. 6a shows that due to the different travel times 502, 504, 506 to each of the receivers, the signals are misaligned. As can be seen from STOT (a sum of the sensor signals represented by overlaying the different signals), the misaligned signals from focal point 402 largely interfere destructively where they overlap in region 601. FIG. 6b shows time shifts 602, 604, 606 to be applied to the sensor signals by the central unit. In this example, the time shifts correspond to the travel times 502, 504, 506 in accordance with the calculations of the central unit 106. (The individual signals may also be scaled to account for the fall-off in intensity for the more distant receivers due to the inverse-square law.) As shown in FIG. 6c, the time shifted signals are summed or combined via a weighted sum to obtain a focused-array signal 608. It can be seen that when aligned, the signals from focal point 402 add constructively. The relative intensity value for the focal point may be calculated as the energy of the focused-array signal divided by the sum of the energies for the individual signals. Other coherence or correlation measures may alternatively be used to calculate the relative intensity value for the focal point.

In practice, the seismic receivers will receive energy not only from focal point 402, but also from all the reflectors of seismic energy. This interfering signal energy may even be expected to largely obscure the seismic energy from focal point 402. However, this interfering signal energy, much like the signal in region 602 of FIG. 6a, is expected to be largely suppressed by the summing operation. With the appropriate time shifts, only the seismic energy from the focal point will interfere constructively and dominate the focused-array signal. Once a new focal point is selected, energy from the previous focal point will now be considered interference, but will be suppressed due to the use of different time shifts that misalign that signal energy during the summing operation.

Returning to FIG. 5, various methods may be used to calculate travel times to each receiver. In some embodiments, a constant seismic wave velocity is assumed, so that the calculated travel time to a given receiver is proportional to the distance of that receiver from the focal point. In other embodiments, velocity values are determined for each cell, ray paths are determined, and the travel times through each cell are calculated and aggregated to determine the travel time. In some embodiments, the ray paths are adjusted to account for refraction as the seismic wave passes from one velocity region to another.

Many seismic wave velocity determination methods are known in the art, and any suitable method can be used. As one example, seismic wave velocity can be estimated for a formation bed based on the offset angle dependence of the reflection coefficients at the boundaries. In other words, receivers detecting energy radiated from the focus point at different offset angles $\beta$ can determine a dependence of the intensity on the offset angle. The velocity relationship across the boundary can then be determined based on the Zoeppritz equations or other physical models. As another example, Snell's law causes the apparent position of a given feature to vary based on the offset angle $\beta$. (In some embodiments, features are identified as intensity values that exceed a threshold value.) Formation velocities can be estimated based on this position dependence. The formation map and velocity map may be iteratively calculated, first determining a formation map and then alternately refining the velocity map and the formation map to improve the accuracy of each.

Figure 7:
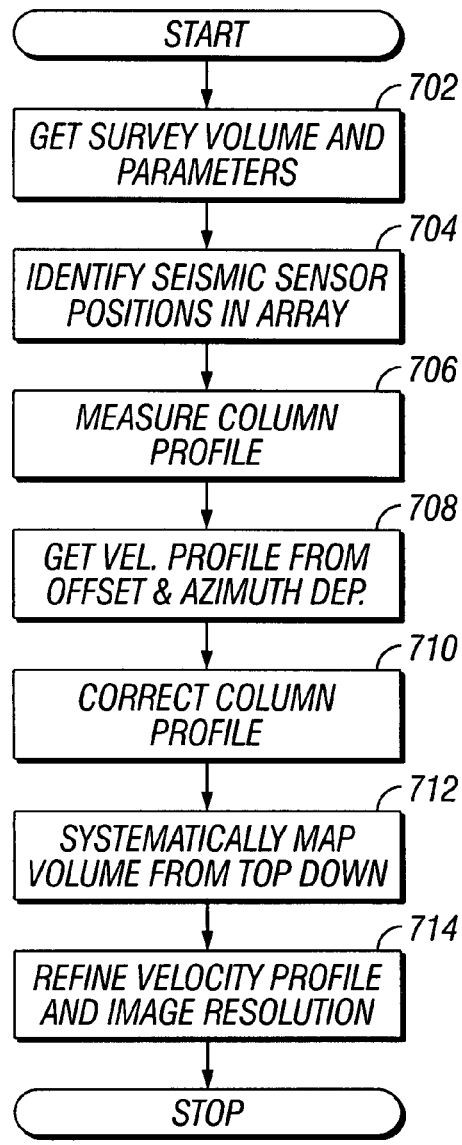
FIG. 7 shows an illustrative imaging method.

FIG. 7 is a flow diagram of an illustrative diffuse seismic imaging method that in some embodiments is implemented by central unit 106. Beginning in block 702, the central unit receives specifications of the desired survey volume and other parameters from a user. The user may specify the extent of the subsurface volume of interest, cell dimensions, time limits, scanning algorithms, and other parameters that the system is configured to employ. In block 704, the central unit identifies the positions of the seismic sensors in the array relative to the subsurface volume of interest. In some embodiments, each of the sensors is equipped with a global positioning system (GPS) sensor that enables precise determination of the sensor's position.

In block 706, central unit 106 scans through the cells in a narrow column beneath the center of the sensor array, measuring intensity as a function of position and offset angle. From these measurements, the central unit 106 determines a crude model of the subsurface structure, including estimates of bed boundary positions. In block 708, central unit 106 estimates bedding orientations and velocities within each bed from the azimuthal and offset angle dependence of the intensity measurements. In block 710, central unit 106 refines the bed boundary position determinations using the estimated velocities. In block 712, central unit 106 systematically scans through the subsurface volume of interest, focusing in turn on each cell in the volume of interest. The signal collection period for each cell may vary from a few seconds to a few hours. An intensity value is determined for each cell, and the dependence as a function of offset angle may be used to estimate velocities along the ray paths from the focus point to the receivers. The velocity estimates are used to update the velocity map for use in imaging deeper layers.

Once intensity and velocity maps have been found, the maps may be refined in block 714 with additional scans through the volume. In some embodiments, the data from subsequent scans is combined with data from preceding scans, while in other embodiments, the previous data is simply replaced. Each subsequent scan may be performed at the same resolution, or with higher resolution (smaller cell sizes) if time permits.

Figure 8:
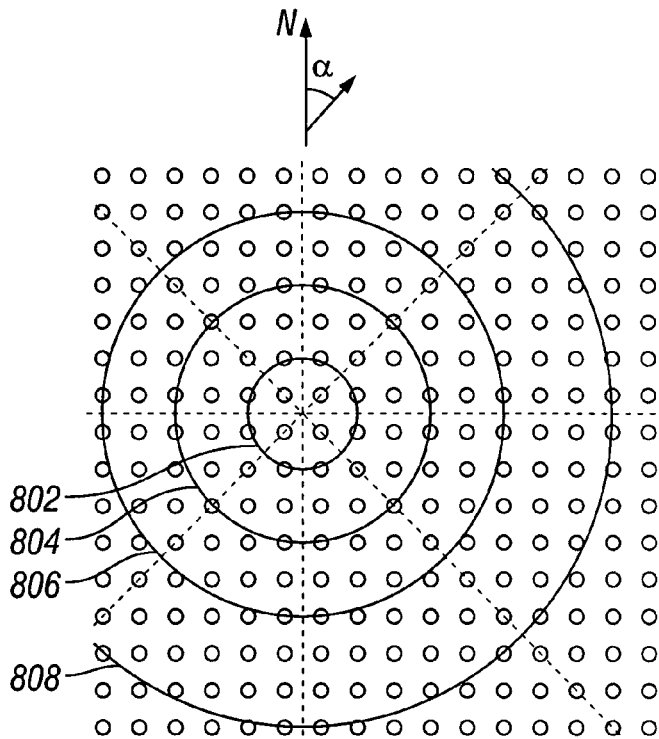
FIG. 8 shows an overhead view of an illustrative sensing array being divided into zones.

FIG. 8 shows an overhead view of an illustrative sensing array to demonstrate the determination of azimuth and offset angle dependence. The array of FIG. 8 is divided into zones represented by circles surrounding the current focus point. Zone 802 is directly above the selected focus point and accordingly the receivers in zone 802 have the smallest offset angle $\beta$. Zone 804 contains the receivers having a range of slightly larger offset angles. Similarly, zones 806 and 808 cover ranges of increasing offset angles. Intensity measurements (properly normalized for the number of receivers) in each of the zones can reveal the dependence of the intensity on offset angle.

The array zones 804-808 may be divided into sectors, each sector covering a range of azimuthal angles $\alpha$. In FIG. 8, the azimuthal angle $\alpha$ is shown as being measured relative to true north, but other reference points can alternatively be used. The sectors of FIG. 8 each cover 45° of arc, but other sector sizes can be employed. An azimuthal dependence of intensity may be indicative of a dipping formation boundary, or may reveal other phenomena such as highly directional faults.

The imaging techniques disclosed herein may be likened to the use of beam-forming techniques to create a synthetic lens with a variable focal length and depth of field. The lens can be focused anywhere below or beyond the sensor array. To improve image quality, the array's depth of field around the focal point can be reduced with additional, more widely distributed seismic sensors. The accuracy (or relative "brightness") of measured intensity values can be improved by increasing the measurement time and/or increasing the number of seismic sensors in the array. It is expected that high intensity values will indicate bed boundaries, whereas low intensity values will indicate space between the bed boundaries.

The array's ability to continuously vary the focal point for real-time measurements may enable unprecedented real-time monitoring of changes to subsurface formations. In so-called "4D" monitoring applications that provide long-term monitoring of reservoirs and other seismic fields, the sensors may be permanently deployed to detect subsurface changes over the course of months or years. Though 4D monitoring can be carried out continuously, it may be more practical to employ the permanently installed sensors on a periodic basis, e.g., to perform scans on a monthly basis.

In some embodiments, central unit 106 will process the seismic signals to measure the intensity of only one focal point at a time. In other embodiments, central unit 106 includes multiple modules that can each provide the appropriate time delays and summations for a corresponding focus point, so that multiple focal point measurements can be made simultaneously from a given set of seismic traces. In such embodiments, it becomes feasible to extend the measurement time for each focal point over multiple days or weeks to bring out boundary details that would otherwise be obscured or too weak to be resolved.

In some embodiments, the array is divided into independently operating sub-arrays, with each sub-array scanning its own focal point through the volume of interest. Such subdivision may greatly speed up the early stages of the scanning process. For scanning at shallow depths, a larger array may offer no advantage over a smaller array. Hence the portion of the array actively scanning a selected focal point may increase with depth.

Seismic imaging techniques disclosed herein can enable seismic surveys to be performed without artificial sources of seismic energy, significantly reducing survey costs. With the diffuse seismic energy model, the actual sources of seismic energy are unimportant. Only their existence is important. Since artificial energy source activity is unnecessary, the scanning process may begin as soon as a sufficient number of sensors are deployed, and continue even as additional sensors are being deployed and even as sensor retrieval begins. In large arrays this scanning time will be continuous over several days. As sensors are coupled into or removed from the system, their measurements can be easily incorporated into or dropped from the imaging calculations.

The receiver frequency band may be adaptively adjusted to reject undesired frequencies. However, it is expected that the imaging process will benefit from keeping the receiver frequency band wide enough to cover all seismic frequencies that propagate efficiently.

Numerous variations and modifications will become apparent to those skilled in the art once the above disclosure is fully appreciated. As one example, the seismic receivers may be autonomous recorders that are deployed to record seismic signals that are later collected together for processing. As another example, various passive seismic imaging techniques may also be applied to the seismic signals from the array to obtain additional information about the subsurface volume of interest. It is intended that the following claims be interpreted to embrace all such variations and modifications.

What is claimed is:

1. A subsurface imaging method that comprises:
   receiving signals from multiple seismic sensors;
   determining an intensity value for each of a set of focal points, wherein for each focal point said determining includes:
      selecting a time offset for each seismic sensor signal, wherein the time offsets provide a uniform travel time from said focal point;
      combining the time-offset seismic sensor signals to obtain a focused-array signal; and
      calculating an intensity value for said focal point; and
   storing said intensity values.

2. The method of claim 1, wherein the seismic sensor signals are processed as they are received to determine said intensity values.

3. The method of claim 2, wherein the intensity values for different focal points are determined from different time intervals of the seismic sensor signals.

4. The method of claim 1, wherein the seismic sensor signals are recorded before said intensity values are determined.

5. The method of claim 1, wherein the focused-array signal represents a sum of the time-offset seismic sensor signals.

6. The method of claim 5, wherein the intensity value represents a ratio of the focused-array signal energy to a sum of the energies of the time-offset signals.

7. The method of claim 1, wherein said calculating an intensity value includes compensating for attenuation.

8. The method of claim 1, wherein for each focal point said determining further includes:
   comparing the intensity value to a threshold, and if the threshold is exceeded, updating a velocity field based on a receiver-offset dependence of the intensity value.

9. The method of claim 1, further comprising:
   displaying said intensity values as a function of focal point position.

10. The method of claim 9, further comprising refining said intensity values with at least one of the following: additional signal data from said seismic sensors, and signals from additional seismic sensors.

11. A subsurface imaging system that comprises:
    multiple seismic sensors each configured to provide a seismic signal representing received seismic energy;
    a processor configured to determine a subsurface map, wherein as part of determining the map, the processor determines for each of multiple focal points:
       a time shift for each seismic signal based on a travel time between the corresponding seismic sensor and the focal point;
       a focused-array signal representing a sum of time-shifted seismic signals; and
       an intensity value from the focused-array signal.

12. The system of claim 11, wherein the processor begins determining the subsurface map even as the seismic sensors are being deployed.

13. The system of claim 11, wherein the processor determines intensity values for different focal points from non-overlapping intervals of the seismic sensor signals.

14. The system of claim 11, wherein the intensity values are determined from pre-recorded seismic sensor signals.

15. The system of claim 11, wherein the focused-array signal represents a sum of the time-offset seismic sensor signals.

16. The system of claim 15, wherein the intensity value represents a ratio of the focused-array signal energy to a sum of the energies of the time-offset signals.

17. The system of claim 11, wherein said calculating an intensity value includes compensating for attenuation.

18. The system of claim 11, wherein for each focal point said determining further includes:
    comparing the intensity value to a threshold, and if the threshold is exceeded, updating a velocity field based on a receiver-offset dependence of the intensity value.

19. The system of claim 11, further comprising a display unit to exhibit the subsurface map.

20. The system of claim 19, wherein the subsurface map is displayed and refined as additional seismic signal data is processed.

* * * * *